June 18, 1963 D. F. COLE 3,094,061
BROILER GRID
Filed Aug. 26, 1960 2 Sheets-Sheet 1

INVENTOR.
DAVID F. COLE
BY
Oberlin, Maky & Donnelly
ATTORNEYS

June 18, 1963 D. F. COLE 3,094,061
BROILER GRID
Filed Aug. 26, 1960 2 Sheets-Sheet 2
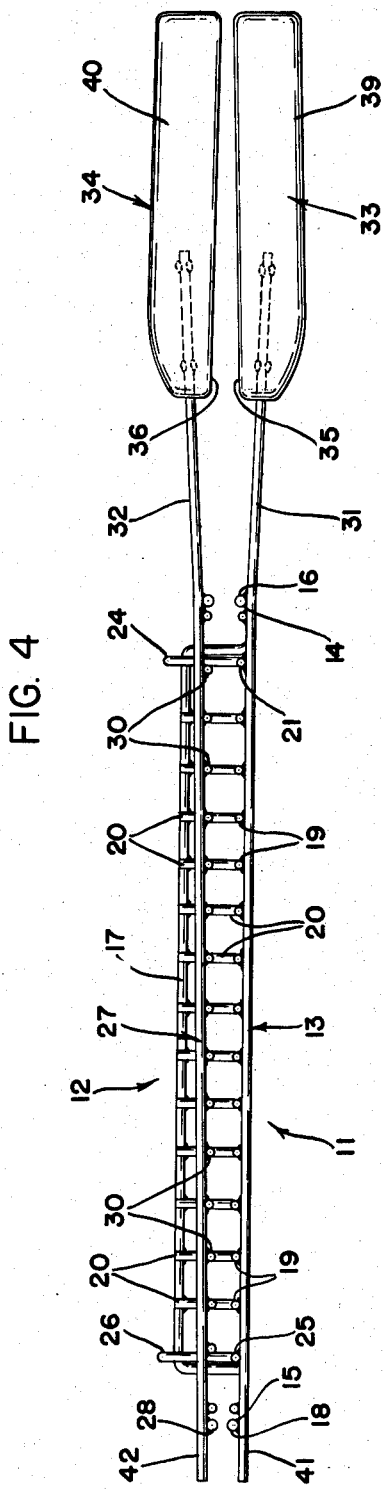
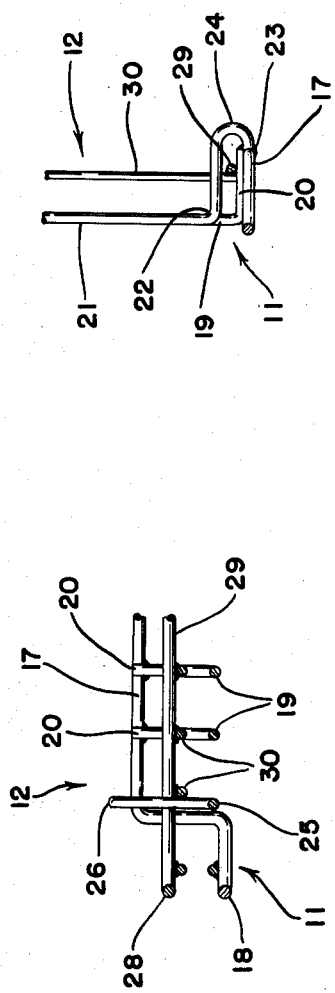
INVENTOR.
DAVID F. COLE
BY
Oberlin, Maky & Donnelly
ATTORNEYS

United States Patent Office 3,094,061
Patented June 18, 1963

3,094,061
BROILER GRID
David F. Cole, 513 Beechwood Drive, Mansfield, Ohio
Filed Aug. 26, 1960, Ser. No. 52,225
2 Claims. (Cl. 99—402)

This invention relates to a portable grid device for holding meat in broiling operations.

More particularly, the present inventions are concerned with holders of this type comprising hinged and manually operated grid sections between which the meat is inserted and held by closure of such sections on the same.

A primary object of the invention is to provide such a broiler grid having a particular structural relation of hinged sections and handle means such that grasping of the latter with normal hand holding pressure not only brings the sections together but resiliently forces them against one another and hence any meat and the like placed therebetween. By virtue of this pressure action in closure of the grid sections, the new grid is especially well-suited for holding meat and the like in vertical position, to the extent that even such thin meat products as bacon may thus be supported.

Another object is to provide such a grid which will accommodate therewithin relatively thick products as well as such thin meat forms as bacon and the like, with the grid adjusting itself to such different thickness of articles placed therein without requiring added manipulation by the user.

It is also an object of the invention to provide such a grid having section edges hinged for limited lateral separation, with these edges being positively forced together by actuation of handles attached respectively to the sections for manipulation of the same and holding of the grid.

An additional object is to provide a hinged grid in which the sections thereof are equipped with handles of novel complementary shape to facilitate joint gripping and holding in a user's hand.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 4 is a top view of the grid;

FIG. 5 is a fragmented horizontal section the plane of which is indicated by the line 5—5 in FIG. 2; and FIG. 6 is a fragmentary vertical section taken on the plane of the line 6—6 in FIG. 2.

Figure 1:
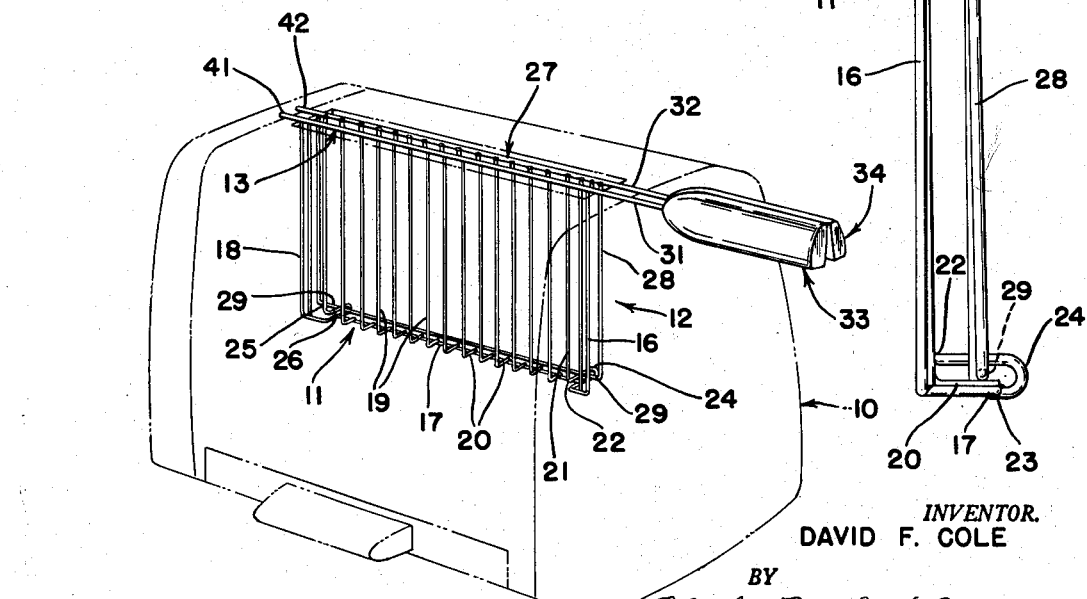
FIG. 1 is a perspective view, on a smaller scale than the remaining figures, of the new broiler grid with a vertical broiler included in dashed outline to illustrate a functional or broiling condition of the grid.

Referring now to the drawings in detail, the dashed outline 10 in FIG. 1 represents a vertical broiler adapted for broiling meat products supported therein by a vertically positioned separable holder inserted in an opening provided in the top of the broiler enclosure. An example of such a broiler having a vertical heating compartment is shown in my Patent No. 2,913,976, dated November 24, 1959, to which reference may be made if desired, the present invention being concerned with the structural and functional characteristics of the new broiler grid illustrated herein and to be described in detail.

This new grid comprises first and second sections respectively designated generally by reference numerals 11 and 12, with both formed from cold drawn wire. The first section comprises a top wire 13 and a framing wire secured at its ends to intermediate points 14 and 15 spaced apart a considerable distance longitudinally on the top wire 13. From the point 14, as further shown in FIG. 1, the frame wire forms an end length 16 extending at right angles to the top wire, a bottom length the major portion 17 of which is off-set to one side, and a return end piece 18 to the top wire at the further point of connection 15. A series of wires 19 of slightly smaller diameter extend in spaced parallel relation from the top wire 13 to the laterally off-set bottom 17 of the frame, with these wires being in the plane of the end frame pieces 16 and 18 for the length of the latter and having right angle bottom extensions 20 to bridge across to the off-set bottom frame piece 17. The elements thus far described accordingly define a grid section having a flat body portion and a contiguous bottom portion projecting a short distance to one side.

A hinge wire 21 extends downwardly from the top wire 13 at a fairly close inboard spacing from the frame end length 16 to a point 22 slightly above the bottom frame piece and then is looped outwardly and back to the underside of the off-set portion 17 of the bottom piece where its other end is secured at 23. Such loop portion is designated by reference numeral 24, and a further hinge wire 25 of similar formation and disposition is provided adjacent the other end piece 18 of the outer frame, with the further hinge loop indicated at 26. It will be observed that these two loops 24 and 26 project slightly beyond the bottom piece 17.

The second grid section 12 comprises a top wire 27 and a frame wire 28 of U-shape having its ends secured to the former. The bottom length 29 of the frame wire 28 extends through the hinge loops 24 and 26 of the first grid section 11, whereby the two are interconnected, and a series of body wires 30 extend in spaced parallel relation between the top wire 27 and such bottom frame piece 29 of the second grid section 12. It will be apparent that the noted hinge connection of the two sections provides limited straight line separation of the same, that is, the bottom 29 of the second section 12 can move relative to the first between an inner position in which it abuts the end frame pieces 16 and 18 and wires 19 of the first section 11 and an outer position interiorly against the closed loops 24 and 26. The two sections can of course be readily pivoted along such hinge connection for opening and closing of the grid.

The two grid sections 11 and 12 are approximately of the same area and their top wires generally opposed when the sections are brought together. With reference to FIG. 4 in particular, these wires 13 and 27 have relatively long free end portions 31 and 32 respectively which are slightly bent so as to diverge outwardly from the grid section bodies. Moreover, these diverging end portions are fitted in specially formed handles 33 and 34 at angles to the axes of the latter, that is, the handles are not aligned with the wires. The handles are made of a suitable heat resisting and insulating plastic and have flat inner sides 35, 36, flat bottoms 37, 38, and curved outer sides 39 and 40, respectively.

Figure 2:
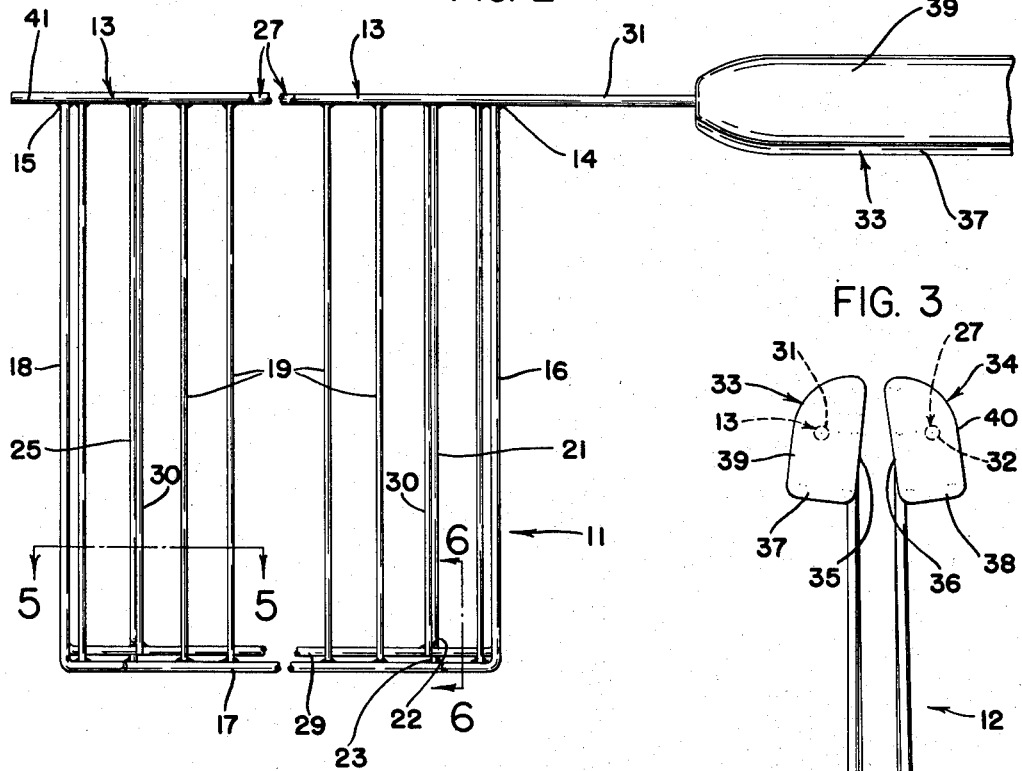
FIG. 2 is an elevational view of the grid, with the center section and handles thereof broken away for convenience.
Figure 3:
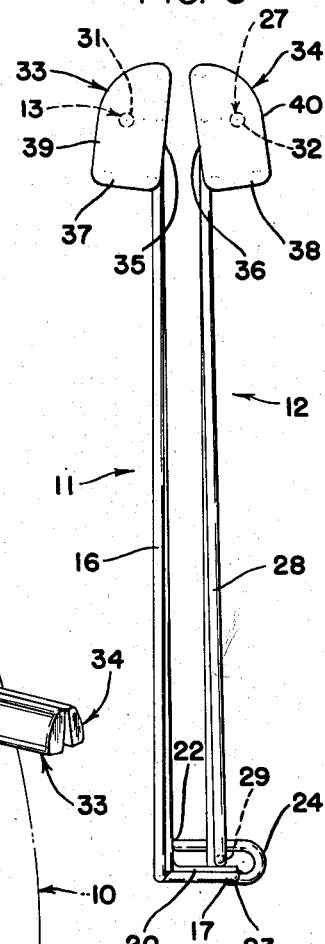
FIG. 3 is an end view of the grid from the handle or right end in the grid disposition shown in FIG. 2.

As best shown in FIG. 3, the handles are not normally parallel at their flat inner sides 35 and 36, but instead are fixed on the top wires 13 and 27 so as to be divergent downwardly in this figure at these faces. When the two handles are first brought together to close the grid sections, they come into contact first at their outer end corners and, in this condition, the remote free ends 41 and 42 of the top wires 13 and 27 come into contact, or substantially so, while the major extents of such wires are still separated. The wires are of course resilient, and under normal gripping pressure, that is, with the two handles gripped in one hand, the inner faces 35 and 36 of the handles are brought together. This action first brings the two top wires fully together by virtue of the handle movement. Secondly, the confronting faces of the handles converge, and this causes the bottom of the two grid sections to be forced together by virtue of the twist or bending moment which is thereby applied.

The combined result of the noted actions, inherent in hand grasping of the closed grid with slight pressure, is positively to bias the grid body sections to closing and hence against a meat product placed between them. The permitted lateral shifting of the effective line of hinging obviously accommodates a considerable variation in the thickness of the articles placed within the grid.

In the vertical broiler use of the new grid illustrated in FIG. 1, the grid is supported on the top wall of the broiler enclosure by its outer projecting ends and its handle connected ends resting on such wall, and the broiler will preferably have internal springs to maintain the sections thereof under closing pressure. This type of support is generally shown in my patent noted in the foregoing.

Other modes of applying the principle of the invention may be employed, change being made as regards the details described, provided the features stated in any of the following claims or the equivalent of such be employed.

I, therefore, particularly point out and distinctly claim as my invention:

1. A broiler grid comprising a pair of generally rectangular grid sections for holding a food product therebetween, hinge means interconnecting said sections along corresponding bottom portions of the same, closure wires, said closure wires forming the upper edges of the grid sections and extending parallel to the thus connected bottom portions of the same, said closure wires projecting beyond the bodies of the sections at corresponding sides of the same and in the same general direction relative to the latter, the two closure wires being formed so that the projecting portions thereof diverge outwardly when the wires are brought into juxtaposition, and handle extensions secured to the projecting ends of the closure wires at angles thereto such that the handle extensions converge from the projecting portions of the closure wires when brought together, initial closure of the sections one upon the other thereby resulting in limited contact of the outer ends of the handle extensions and of the remote ends of the closure wires, with hand pressure applied to the handle extensions to bring the same fully together resiliently forcing the adjacent corner portions of the grid sections into contact.

2. The combination of claim 1 wherein said handle extensions have inner flat surfaces which diverge downwardly toward said bottom portions of said grid sections, whereby hand pressure applied to said handle extensions causes convergence of said flat, inner surfaces and effects twisting of said closure wires whereby said bottom portions of said grid sections are forced against each other.

References Cited in the file of this patent

UNITED STATES PATENTS

| | | |
|---|---|---|
| 523,127 | Miller | July 17, 1894 |
| 2,913,976 | Cole | Nov. 24, 1959 |
| 2,962,957 | Bork | Dec. 6, 1960 |